(12) United States Patent
Jiang et al.

(10) Patent No.: US 7,774,769 B2
(45) Date of Patent: Aug. 10, 2010

(54) TRANSMITTING TRACE-SPECIFIC INFORMATION IN A TRANSFORMED APPLICATION

(75) Inventors: Xiaodan Jiang, Shanghai (CN);
Jinquan Dai, Songjiang District (CN)

(73) Assignee: Intel Corporation, Santa Clara, CA (US)

( * ) Notice: Subject to any disclaimer, the term of this patent is extended or adjusted under 35 U.S.C. 154(b) by 1357 days.

(21) Appl. No.: 11/232,791

(22) Filed: Sep. 22, 2005

(65) Prior Publication Data

US 2007/0083857 A1    Apr. 12, 2007

(51) Int. Cl.
*G06F 9/45*    (2006.01)
(52) U.S. Cl. .................. 717/156; 717/155; 717/158; 717/128
(58) Field of Classification Search .......... 717/132, 717/154–157
See application file for complete search history.

(56) References Cited

U.S. PATENT DOCUMENTS

| | | | | | |
|---|---|---|---|---|---|
| 5,355,494 | A | * | 10/1994 | Sistare et al. | 717/154 |
| 5,937,195 | A | * | 8/1999 | Ju et al. | 717/156 |
| 5,966,539 | A | * | 10/1999 | Srivastava | 717/156 |
| 6,189,141 | B1 | * | 2/2001 | Benitez et al. | 717/153 |
| 6,427,234 | B1 | * | 7/2002 | Chambers et al. | 717/140 |
| 7,003,629 | B1 | * | 2/2006 | Alsup | 711/118 |
| 7,039,909 | B2 | * | 5/2006 | Wu et al. | 717/156 |
| 7,581,214 | B2 | * | 8/2009 | Dai et al. | 717/159 |
| 2005/0108696 | A1 | | 5/2005 | Dai et al. | 717/151 |
| 2005/0188364 | A1 | * | 8/2005 | Cockx et al. | 717/159 |
| 2005/0235279 | A1 | | 10/2005 | Chen | 717/140 |

OTHER PUBLICATIONS

Refining Data Flow Information using Infeasible Paths Rastislav Bodik, Rajiv Gupta, Mary Lou Soffa ACM SIGSOFT Software Engineering Notes vol. 22 , Issue 6 pp. 361-377 Year of Publication: 1997.*
Superthreading: Integrating Compilation Technology and Processor Architecture for Cost-Effective Concurrent Mutlithreading Author: Jenn-Yuan Tsai Graduate College of the University of Illinois at Urbana-Champaign Published: 1998 pp. i, iii, 5-23, 36-47, 70-87.*
A Programming Environment for Packet-Processing Systems: Design Considerations Harrik Vin et al 3rd Workshop on Network Processors & Applications (Feb. 2004).*
Path Analysis and Renaming for Predicated Instruction Scheduling Carter et al Published in the International Journal of Parallel Programming, 2000.*

(Continued)

*Primary Examiner*—Lewis A Bullock, Jr.
*Assistant Examiner*—Paul Mills
(74) *Attorney, Agent, or Firm*—Trop, Pruner & Hu, P.C.

(57) ABSTRACT

In one embodiment, the present invention includes a method for partitioning a program segment into at least a first stage and a second stage, determining a live set of variables and control flow information alive at a boundary between the first and second stages, and controlling the first stage to transmit a trace-specific portion of the live set for a first trace to the second stage via a communication channel. In such manner, reduced transmission of data between the stages is effected. Other embodiments are described and claimed.

13 Claims, 11 Drawing Sheets

OTHER PUBLICATIONS

Static Analysis of Guarded Code Ping Hu Languages, Compilers, and Run-Time Systems for Scalable Computers, 2000.*

Superblock Formation Using Static Program Analysis Hank et al Proceedings of the 26th annual international symposium on Microarchitecture Austin, Texas, United States pp. 247-255 Year of Publication: 1993.*

Deferred Data-Flow Analysis : Algorithms, Proofs and Applications Sharma et al Department of Computer Science University of Maryland, College Park 1998.*

Compiler-Generated Communication for Pipelined FPGA Applications Ziegler et al Proceedings of the 40th annual Design Automation Conference Compilation techniques for reconfigurable devices pp. 610-615 Year of Publication: 2003.*

\* cited by examiner

TRANSMITTING TRACE-SPECIFIC INFORMATION IN A TRANSFORMED APPLICATION

BACKGROUND

Embodiments of the present invention relate to data processing and more particularly to optimizing software applications.

Advances in processor technology have spawned the development of network processors (NPs), which are designed specifically to meet the requirements of next generation network equipment. In order to address the unique challenges of network processing at high speeds (e.g., the latency for a single external memory access in a NP is usually larger than the worst-case service time), modern network processors generally have a highly parallel multi-processor architecture. For instance, some network processors process packets in a microengine cluster that includes multiple microengines. Each microengine is a programmable processor to perform various activities, for example, packet processing. To process packets at high speeds, multiple microengines may run in parallel, each supporting multiple hardware threads.

Some processors such as network processors may include highly parallel architectures. Accordingly, such processors may be well-suited for use with applications that take advantage of parallelism. For example, a network application for packet processing may include the functions of receiving a packet, routing table look-up, and enqueueing of the packet. Such an application may be parallelized through pipelining and multi-threading transformations.

In implementing such a transformation, the data may typically be transmitted from stage to stage via a global resource such as one or more data transmission channels. However, not all data transmitted from stage to stage may be necessary. As a result, unnecessary overhead is incurred in transmitting data that are not needed. More so, when a transformation is multi-threaded, each thread must synchronize about certain critical areas of the processing, such as data transmission. Accordingly, excessive data transmission can negatively impact performance of multi-threaded applications.

DETAILED DESCRIPTION

In various embodiments, a software program may be compiled to transform the program into a plurality of stages to provide for efficient execution of the program via multiple processing units, for example, independent cores of a processor, individual processors, microengines of a network processor or the like. In different implementations, a compiler or other software tool may be used to analyze an original application and partition it in an appropriate manner to improve pipelining performance. Furthermore, in some implementations an amount of data to be transmitted between upstream and downstream stages of the partitioned program may be minimized. Accordingly, multi-threaded operation may be improved as synchronizations between different threads may be minimized.

Figure 1A:
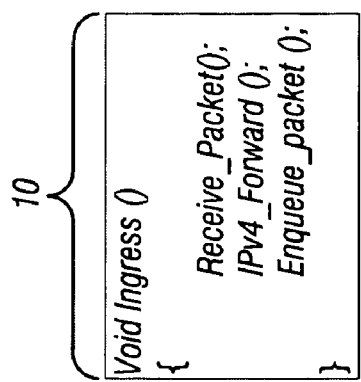
FIG. 1A is an example application that may be pipelined and parallelized in accordance with an embodiment of the present invention.

FIG. 1A shows an example of an application 10 that may be pipelined and parallelized in accordance with an embodiment of the present invention. This example depicts an exemplary ingress operation for a networking protocol such as an Internet Protocol, version four (IPv4) protocol. As shown in FIG. 1A, application 10 may perform a series of tasks including receipt of a packet, packet forwarding and enqueuing. Of course, in other implementations additional or different operations may be performed on a packet or other data. In application 10, these three operations may be executed serially or sequentially for each data packet. However, the nature of these operations may be such that several packets may be processed simultaneously, depending upon a hardware implementation used. For example, a computing platform may include multiple processors, each including multiple sub-processors to perform parallel operations.

Figure 1B:
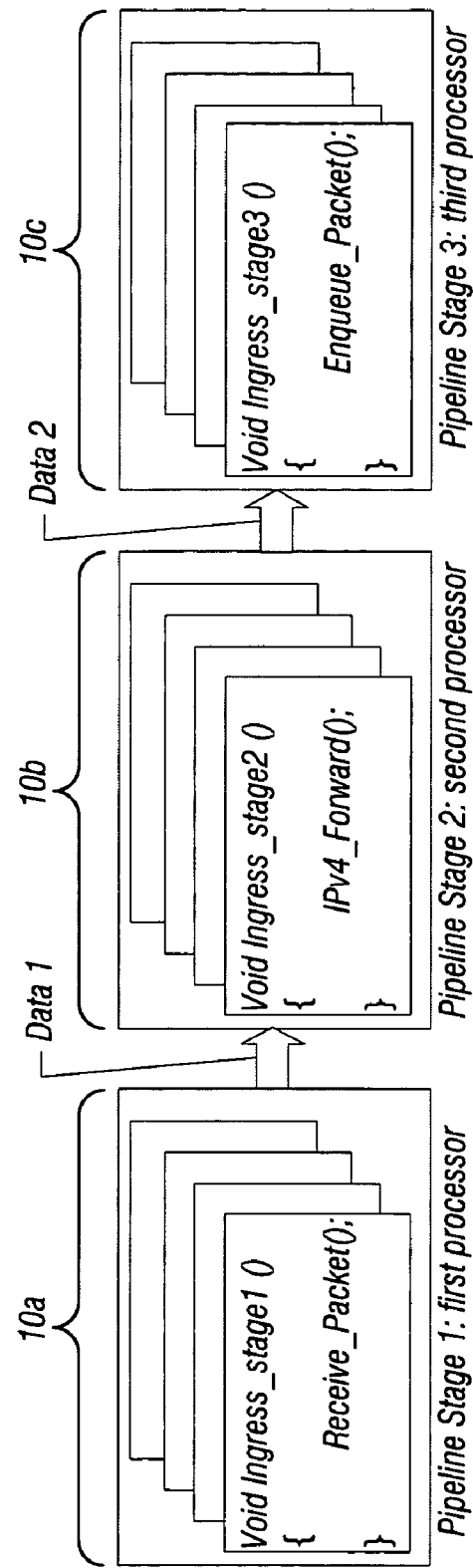
FIG. 1B is the example application of FIG. 1A after a pipelining transformation in accordance with one embodiment of the present invention.

Because application 10 is highly parallel, it may be readily parallelized via pipelining and multi-threading transformations. Accordingly, application 10 may be pipelined, for example, into three stages, 10a, 10b, and 10c, as shown in FIG. 1B, in which each stage may provide for execution of one of the three operations on multiple packets. As shown in FIG. 1B, application 10 may be transformed into a first stage (i.e., Pipeline Stage 1) 10a to be executed on a first processor, a second stage (i.e., Pipeline Stage 2) 10b to be executed on a second processor, and a third stage (i.e., Pipeline Stage 3) 10c to be executed on a third processor. As further shown in FIG. 1B, necessary data (e.g., Data 1 and Data 2) may be passed from each stage to the next succeeding stage. Thus application 10 is transformed into a three-way pipelined application in which each stage is in turn four-way multi-threaded. While shown with this particular implementation in the embodiment of FIG. 1B, it is to be understood that the scope of the present invention is not so limited.

When an application is parallelized, the application is first pipelined; that is, two or more processing units, either of separate processors or of a single processor, e.g., a NP, may be organized as pipeline entities, in which each pipeline stage is to execute a portion of the original application. Data flow and control flow information used during execution may be transmitted from one stage to the next stage. In many implementations, each pipeline stage may further be multi-threaded, such that each thread performs essentially the same operations on newly received packets. Modifications to global resources (such as channels between the processing units) may be protected by critical sections to ensure mutual exclusiveness and synchronization between threads.

In various embodiments, the transmission of data between stages in the pipelining transformation may be minimized based on trace information, in light of the multi-threading transformations applied to the pipeline stages. That is, a compiler may select one or more traces (i.e., a sequence of basic blocks) in the program, either based on heuristics or actual profiling information, and implement code modifications to transfer the minimum data specific to each selected trace. In addition, a bulk transmission may be generated and transmitted for off-trace codes. In so doing, critical sections may be reduced minimizing synchronization costs.

Figure 2:
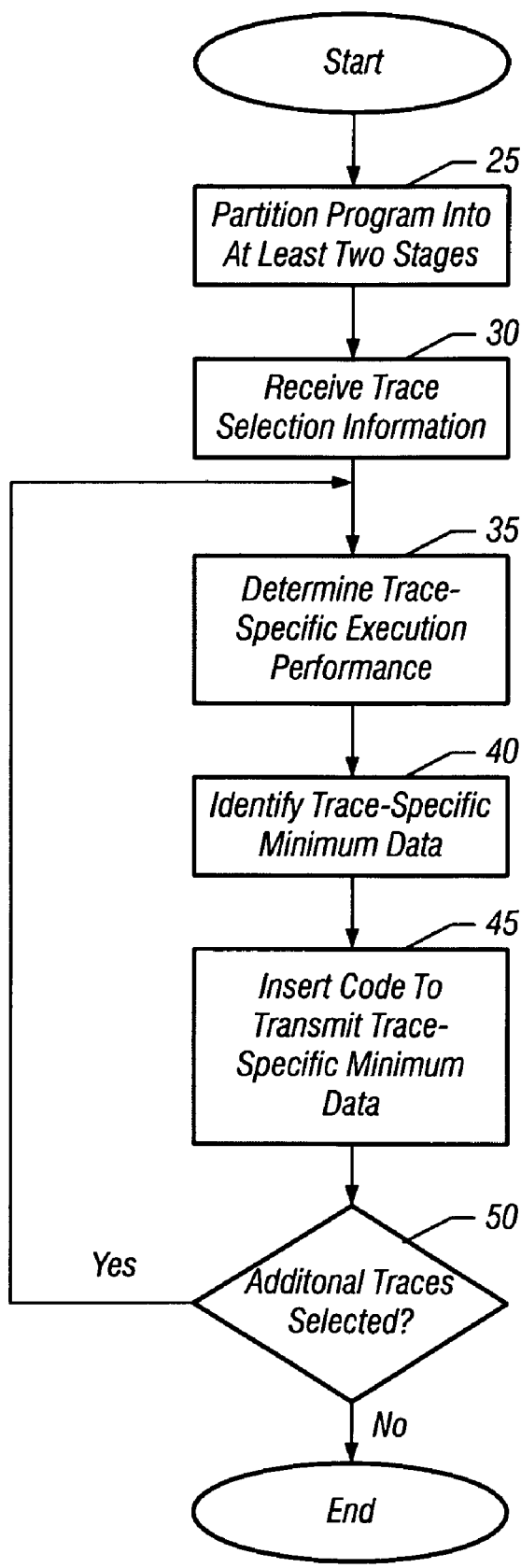
FIG. 2 is a flow diagram of a method in accordance with one embodiment of the present invention.

Referring now to FIG. 2, shown is a flow diagram of a method in accordance with one embodiment of the present invention. As shown in FIG. 2, method 20 may be used to perform program transformations in accordance with an embodiment of the present invention. As shown in FIG. 2, method 20 may begin by partitioning a program into at least two stages (block 25). For example, an application program may be transformed into an upstream stage and a downstream stage, where data and other information from the upstream stage are passed to the downstream stage via a transmission channel. For example, for a multi-threaded parallel application, the upstream stage may be performed on a first processor, while the downstream stage may be performed on a second processor.

Still referring to FIG. 2, next trace selection information may be received (block 30). For example, a compiler or other software tool may receive an identification of one or more traces of the program to be analyzed, for example, to implement optimizations for the trace(s). As one example, a user may select one or more traces for optimization based on profiling that indicates significant use of the trace, e.g., a trace including a hot spot.

Next, trace-specific execution performance may be determined (block 35). That is, the trace may be analyzed to determine its execution parameters including, for example, data to be transferred from the trace to another stage if the trace is taken. Based on this determination, trace-specific minimum data may be identified (block 40). In other words, a minimum amount of data that should be transmitted from an upstream stage including the trace to a downstream stage if the trace is taken may be identified. As will be discussed further below, this minimum data may include program variables and control flow information.

Using this information, code may be inserted in the trace to cause transmission of this trace-specific minimum data (block 45). Accordingly, if the trace is taken during program execution only the minimum amount of data needed by the downstream stage is transmitted. This minimum data transfer thus reduces bandwidth for a transmission channel between the upstream stage and the downstream stage and may thus improve performance of multi-threaded applications, for example, by reducing the size of a critical section prior to synchronizations.

Finally, in the embodiment of FIG. 2, it may be determined whether additional traces have been selected for analysis (diamond 50). If such traces have been selected, control may return to block 35, discussed above. If instead at diamond 50 it is determined that no additional traces are to be analyzed, method 20 may conclude.

Figure 3:
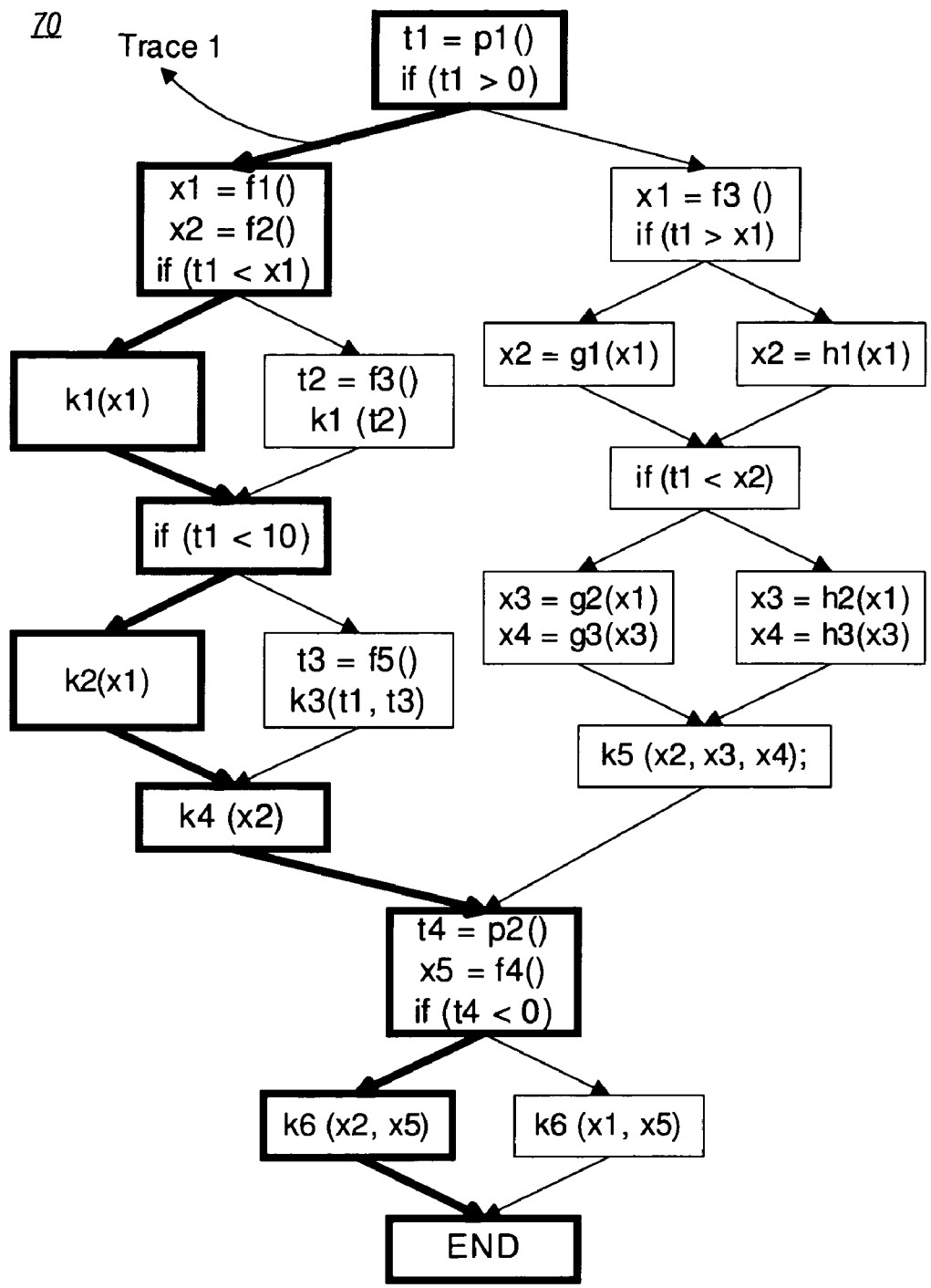
FIG. 3 is a control flow graph for an application program.

In a pipelining transformation, an original program is first partitioned into several stages, and then a control flow graph (CFG) for each stage is generated, which may be generated from a CFG for the original program. Referring now to FIG. 3, shown is a control flow graph for an application program 70, in which a first trace (i.e., Trace 1) is marked in bold.

Figure 4:
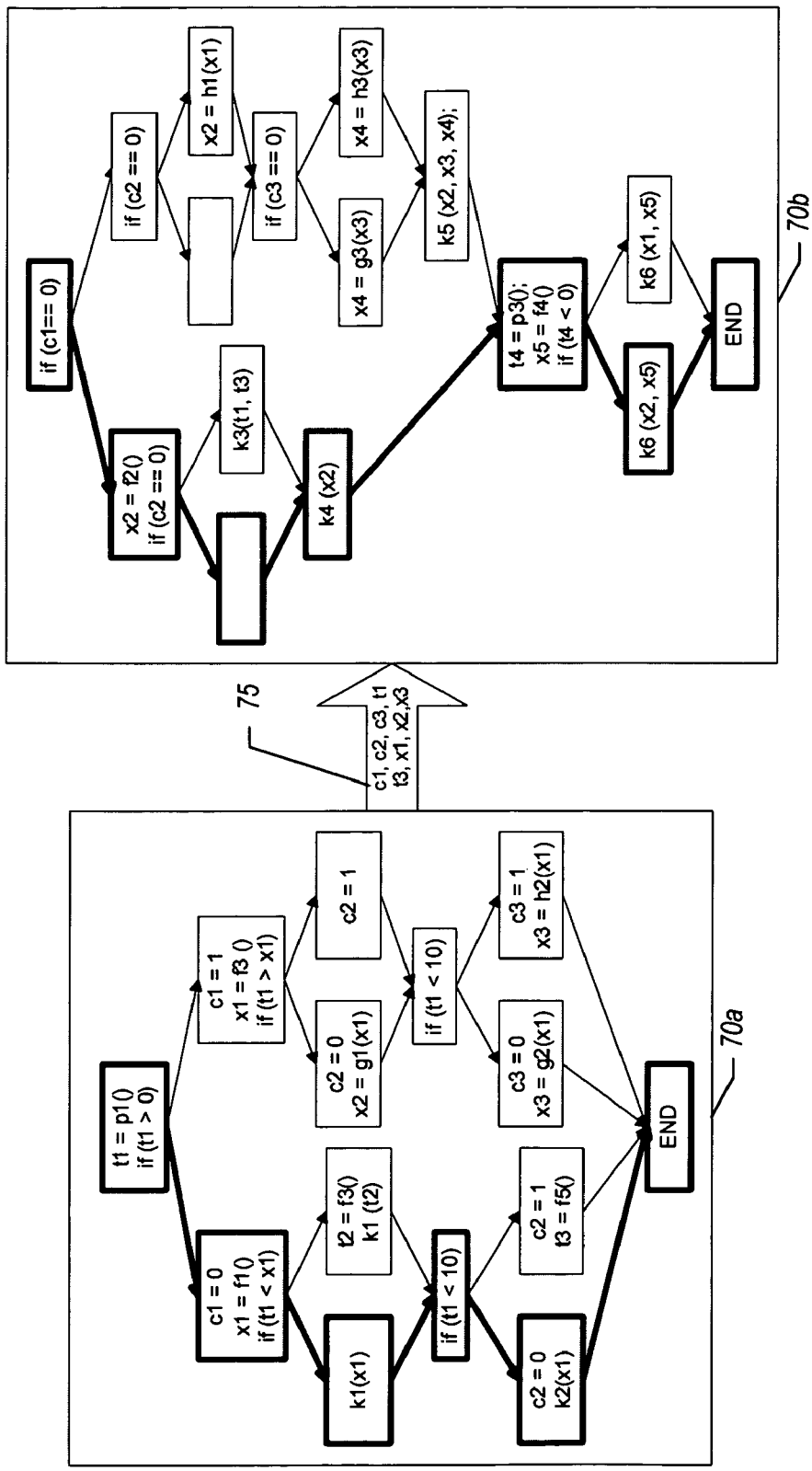
FIG. 4 a control flow graph of the example application program of FIG. 3 as partitioned.

As an example, application program 70 may be partitioned into two pipeline stages, namely a first stage 70a and a second stage 70b, as shown in FIG. 4 where the first trace (Trace 1) is marked using bold lines. After partitioning the program into two stages, variables that are alive at the boundary or partition of the application are transmitted across the partition, so that the downstream pipeline stage may begin executing in the proper context. In addition, certain control flow information is transmitted over the partition so that the downstream stage may begin execution at the correct program point. Those data are collectively referred to herein as the live set and may be transmitted across the program partition through a communication or transmission channel 75 (e.g., a pipe) from first stage 70a to second stage 70b, as shown in FIG. 4.

Figure 5:
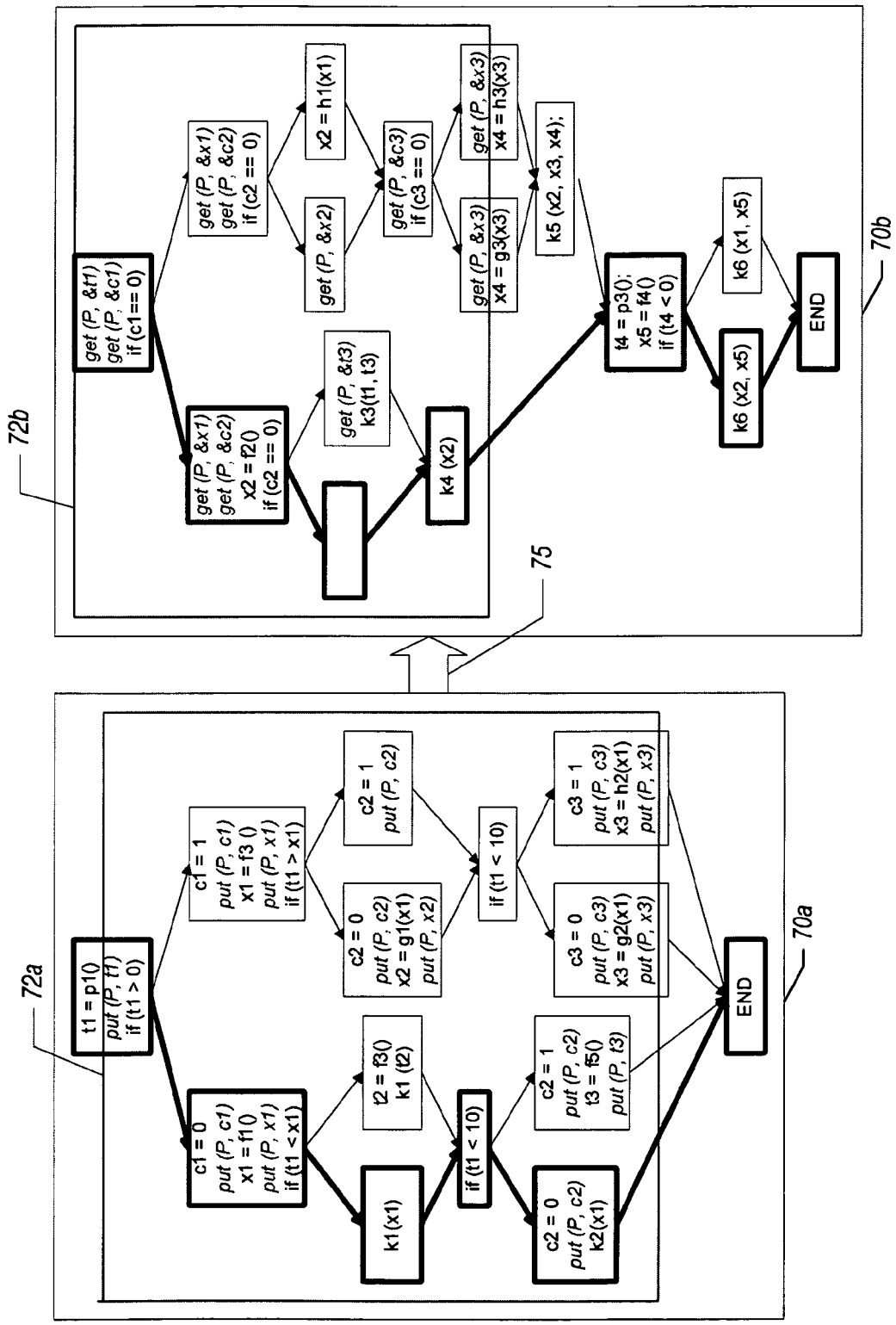
FIG. 5 is a control flow graph of the partitioned application program of FIG. 4 to provide for a conditionalized live set transmission.

In one embodiment, the transmission of the live set between two stages may be conditionalized via the transmission of every object in the live set, as shown in FIG. 5, which is a control flow graph of the partitioned program to provide for a conditionalized live set transmission. As shown in FIG. 5, the "put" instructions in many blocks of first stage 70a may place the variables or control flow information identified in the instruction into the pipe, while the corresponding "get" instructions in many blocks of second stage 70b may obtain the data from the pipe. The blocks that include transmission-associated instructions (e.g., "put" or "get" instructions, also referred to herein as "pipe operations") may be considered critical sections of the program when the pipeline stages are multi-threaded, as the transmission of the live set has to be synchronized across multiple threads, due to the global resource used. With these conditionalized transmissions, the critical section around the pipe operations can be very large (as suggested by the boxes 72a and 72b in FIG. 5).

Figure 6:
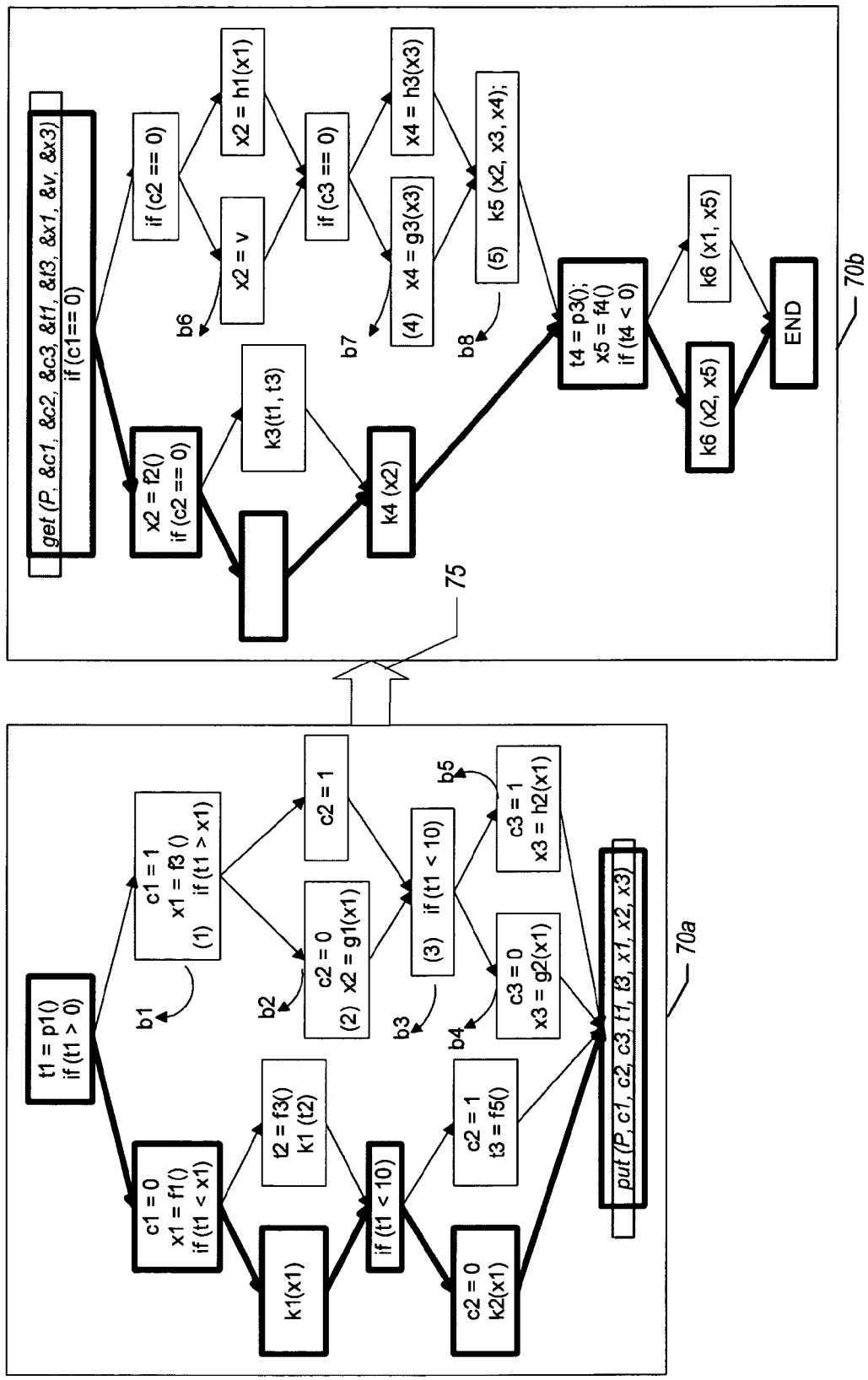
FIG. 6 is a control flow graph of the partitioned application program of FIG. 4 to provide for a unified live set transmission.

Accordingly, in some implementations, a unified transmission between two stages (i.e., sending all the live set with aggregated pipe transmissions at a single program location) may be implemented. In this case, the critical section around pipe operations is much smaller. Referring now to FIG. 6, shown is a control flow graph of a partitioned program to provide for a unified live set transmission. As shown in FIG. 6, first stage 70a and second stage 70b have been modified such that only a single pipe transmission occurs between the stages. Specifically, a single "put" instruction in first stage 70a is used to provide transmission of the live set to second stage 70b, at the "get" program instruction at the beginning of second stage 70b. In such manner, the critical section in these stages is the single pipe transmission instruction (i.e., "put" and "get"). However, a single aggregated transmission of the live set for the whole program can transmit more objects than needed for a particular trace in the program. That is, different live set data is used when different traces in the program are taken. For instance, the program variables and control flow information c3, t1, t3, x2 and x3 are not needed to be transmitted if trace 1 (as shown in bold lines) in upstream stage 70a in FIG. 6 is taken.

Figure 7:
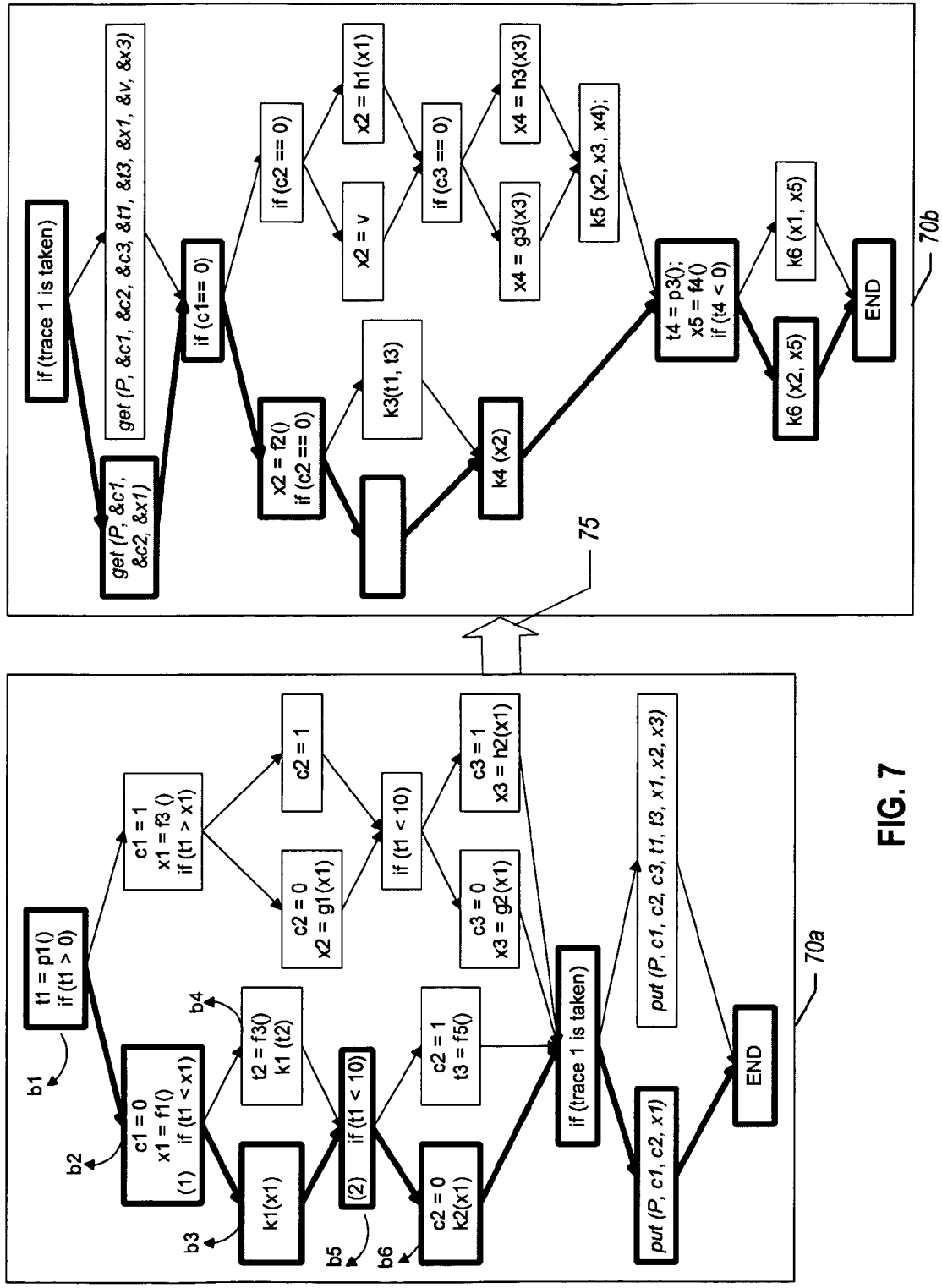
FIG. 7 is a control flow graph of the partitioned application program of FIG. 4 to provide for trace-specific live set transmission in accordance with one embodiment of the present invention.

Thus, in many embodiments only a subset of the live set that is required for a selected trace may be transmitted, in addition to an aggregated live set transmission for off-trace codes. An example trace-specific live set transmission in accordance with one embodiment of the present invention is shown in FIG. 7. Specifically, FIG. 7 shows a control flow graph of a partitioned program to provide for transmission of only a trace-specific amount of data. Thus referring to first stage 70a of FIG. 7, a conditional instruction is inserted into the control flow graph (i.e., the "if (trace 1 is taken)" instruction). Thus if the selected trace (trace 1) is taken, only the minimum amount of information needed in second stage 70b for traversing trace 1 is transmitted. Thus as shown in first stage 70a, a "put instruction" is used to transmit only this trace-specific live set data, namely control flow information c1 and c2 and variable x1. In such manner, an amount of data transmission may be reduced, providing for improved performance, particularly for multi-threaded applications.

Figure 8:
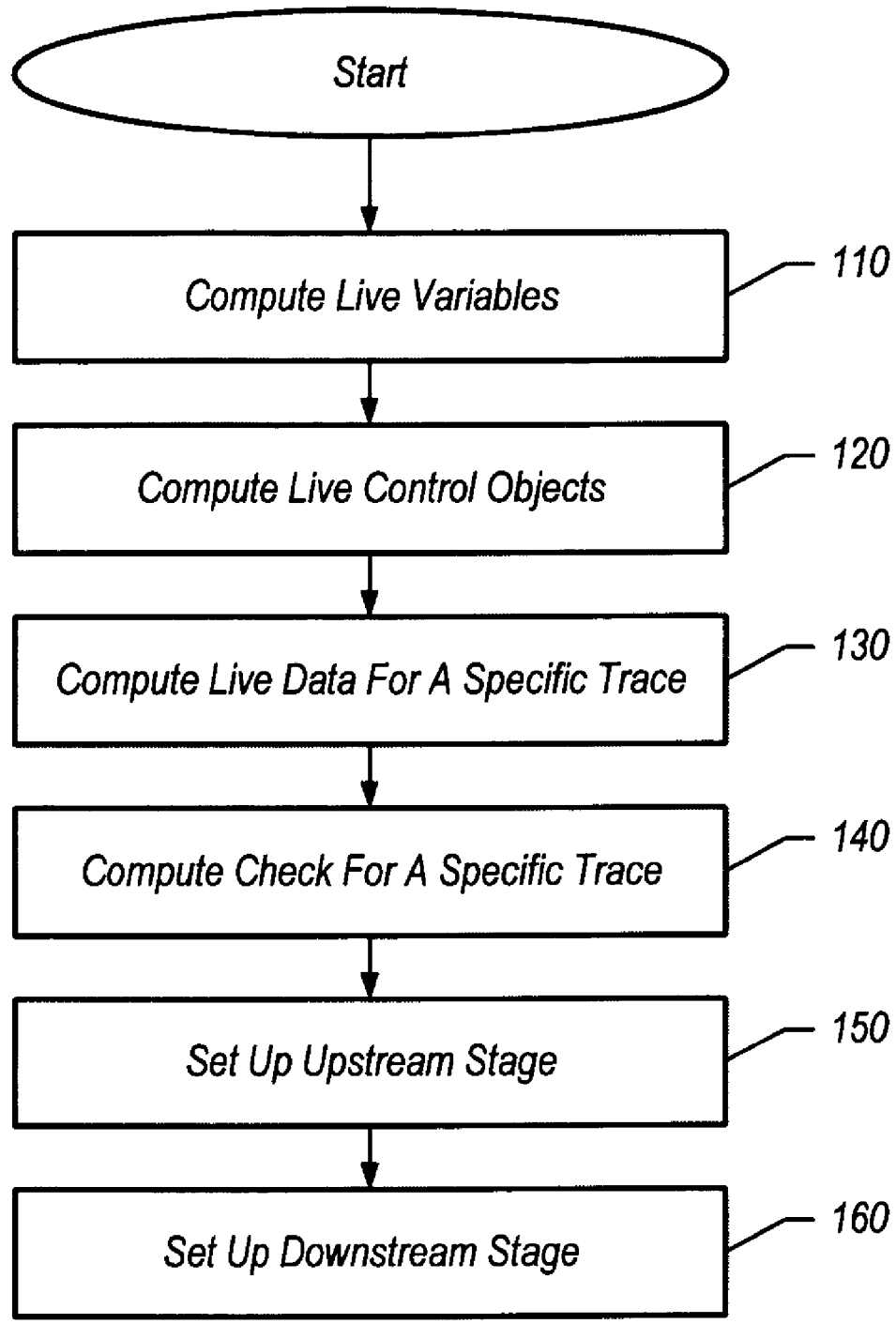
FIG. 8 is a flow diagram of a method in accordance with one embodiment of the present invention.

Referring now to FIG. 8, shown is a flow diagram of a method in accordance with one embodiment of the present invention. As shown in FIG. 8, method 100 may be used to minimize the live set transmission over a program partition based on trace information. As shown in FIG. 8, method 100 may begin by computing the live variables (block 110). Specifically, the live variables at the program partition may be computed. In some embodiments, the computation of the live variables may be based on reaching information between the pipeline stages. As mentioned before, variables that are alive at the boundary of the program partition are to be transmitted so that the downstream pipeline stage may begin executing in the proper context. In one embodiment, the live variables may be computed as follows. For a variable v, it is in the live set if and only if one of its definition points (d) is in the upstream pipeline stage, one of its use points ($\mu$) is in the downstream stage, and d can reach u in the program. For instance, variables t1, t3, x1, x2 and x3 are alive at the boundary of the program partition of FIG. 4. In other embodiments, the live variables may be packed such that if several variables are not alive at the boundary simultaneously, only one of them is transmitted.

Figure 9:
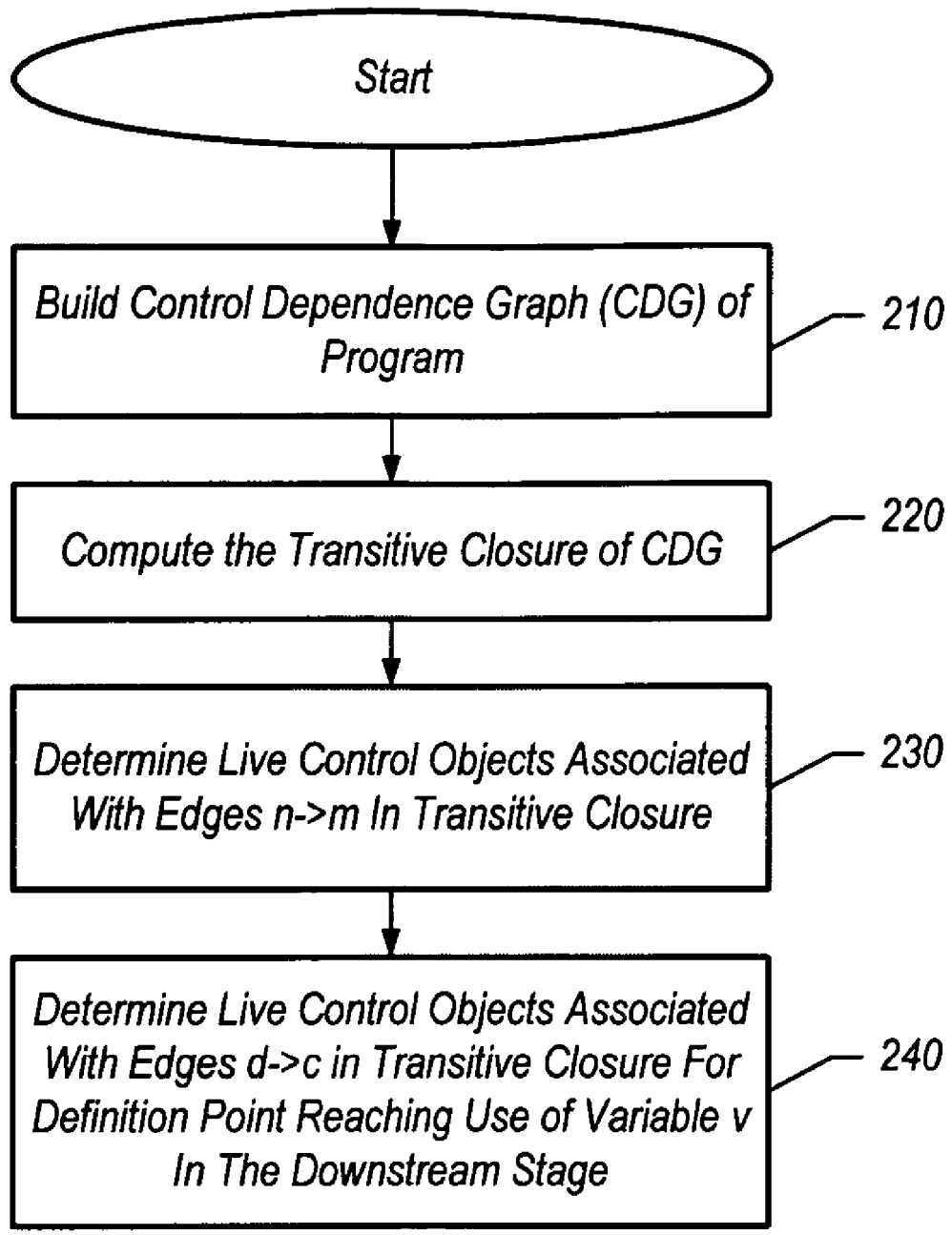
FIG. 9 is a flow diagram of a method for computing live control objects in accordance with one embodiment of the present invention.

Still referring to FIG. 8, next the live control objects may be computed (block 120). That is, in addition to variables, control flow information is to be transmitted over the program partition so that the downstream stage may begin executing at the correct program point, and thus this information may be computed. In some embodiments, the computation of live control objects may be based on a control dependence, as well as reaching information between the pipeline stages. Referring now to FIG. 9, shown is a flow diagram for computing live control objects in accordance with one embodiment of the present invention.

As shown in FIG. 9, method 200 may begin by first building a control dependence graph (CDG) of the program (block 210). Then, using the CDG, the transitive closure of the CDG may be computed (block 220). Using this information, next live control objects associated with control dependent instructions may be determined (block 230). More specifically, for instructions n and m, there is an edge n->m in the transitive closure if and only if n is (transitively) control dependent on m (i.e., there is a path from n to m in the CDG). In other words, the result of executing instruction m (e.g., a conditional instruction) may (at least partially) determine if instruction n is to be executed or not. Therefore, if m is in the upstream stage and n is in the downstream stage, the decision of the conditional instruction m (i.e., a control object that is assigned a distinct control value in each of the branches of m) is alive and may be transmitted for the proper execution of instruction n.

For instance, instruction (4) in block b7 of second stage 70b in FIG. 6 is control dependent on instruction (3) in block b3 of first stage 70a of FIG. 6 (i.e., the upstream stage). Therefore, the control object c3 associated with instruction (3) is alive at the boundary of the program partition. Consequently, this control object c3 may be assigned a distinct control value in blocks b4 and b5 respectively (i.e., a value of 0 and 1, respectively), and be transmitted to downstream stage 70b, as shown in FIG. 6.

Still referring to FIG. 9, the CDG may further be used to determine live control objects associated with control dependent variables (block 240). More specifically, for each live variable v computed in block 110 (of FIG. 8), if one of its definition points (d) in the upstream pipeline stage reaches one of its use points (u) in the downstream stage, its value is restored in the downstream stage. Therefore, if d is (transitively) control dependent on an instruction c, the control object associated with the conditional instruction c is alive and may be transmitted for the proper restoration of variable v.

For instance, instruction (2) in block b2 of first stage 70a of FIG. 6 defines a variable x2, and reaches instruction (5) in block b8 of second stage 70b of FIG. 6. Since instruction (2) is control dependent on instruction (1) in block b1 (of first stage 70a), the control object c2 associated with instruction (1) is alive. Consequently, x2 can be restored in block b6 in FIG. 6.

In other embodiments, each control object may be stored using one bit (e.g., for "if" instructions) or more bits (e.g., for "switch" instructions), and they can also be packed such that if they are not alive in the pipelined program simultaneously, only one of them is transmitted. In any event, the live control objects may be computed in one of these manners and used in generating a program to perform minimum trace-specific transmissions.

Thus, referring back to FIG. 8 blocks 110 and 120 (each of which may be performed in different manners in a given implementation) thus determine the live data that may be transmitted from an upstream stage to a downstream stage. However, because only a subset of the live set is alive when a specific trace in the upstream stage is executed, data in this subset are the minimum transmission for that specific trace. Still referring to FIG. 8, the live data for a given trace thus may be computed (block 130). This live data of course may include both live variables as well as live control objects, and may be computed based on trace information.

For each control object, it is alive for a particular trace if and only if its associated conditional instruction is in that trace. For instance, control objects c1 and c2 are alive for trace 1 (shown in bold) in FIG. 7. For each live variable, it is alive for a particular trace if and only if one of its definition points (d) in the upstream pipeline stage reaches one of its use points ($\mu$) in the downstream stage, d is in that trace, and u is not control dependent on any conditional instructions in the upstream stage, or u is in that trace in the original program.

As a first example with reference to FIG. 7, variable x1 is defined in block b2 (in trace 1) in first stage 70a, and its use in second stage 70b is not control dependent on any conditional instructions in first stage 70a. Therefore, if trace 1 is taken in first stage 70a, x1 may be used in second stage 70b and thus should be transmitted.

As a second example with reference to FIG. 7, though variable t1 is defined in block b1 (in trace 1) in first stage 70a, its use in second stage 70b is control dependent on instruction (2) in block b5 in first stage 70a, and not in trace 1. Hence, if trace 1 is taken in first stage 70a, t1 will never be used in the second stage 70b and thus should not be transmitted.

Still referring to FIG. 8, next a check for each given trace may be computed (block 140). That is, before sending and receiving the live data for a specific trace, the program should first check to determine whether the selected trace is executed in the upstream stage. In one embodiment, the check may be implemented by comparing the value of each live control object for that trace and the control value for the branch in that trace. If the values are the same, the upstream stage is assumed to execute the specific trace, and only the live data for that trace should be transmitted. For instance, in FIG. 7 the check instruction "if (trace 1 is taken)" may be implemented, in one embodiment as:

$$\text{if } (c1 == 0 \,\&\&\, c2 == 0) \qquad [1]$$

In other words, if the value of both control objects c1 and c2 equal zero, trace 1 was the path traversed from the first block b1 through the sixth block b6.

On the other hand, other traces in the program may have the same live control objects and control values as the given trace, due to some of the control objects that are not transmitted. For instance, no matter whether trace 1 (i.e., traversing blocks b1->b2->b3->b5->b6), or another trace (i.e., traversing blocks b1->b2->b4->b5->b6) is taken in FIG. 7, the above check is always true. It is thus guaranteed that the live data for these traces are the same, and thus the transmission is correct no matter which trace is taken. For example, assume the control object associated with instruction (1) in block b2 in FIG. 7 is not alive. If a definition d of variable v is control dependent on instruction (1), d cannot reach any use of v in the downstream stage; otherwise the control object is alive. Thus, no additional variables are alive, no matter which branch is taken at instruction (1).

Next with reference to FIG. 8, the trace-specific live set transmission for the upstream stage may be set up (block 150). Specifically, for each given trace, a check for that trace may be inserted at the end of the upstream stage. This check code may thus confirm that the trace is taken. Then additional code may be inserted to send only the live variables and the live control objects for the selected trace to the downstream stage if the check is true. For instance, the check code for sending the trace-specific live data for trace 1 in FIG. 7 is shown above as instruction [1]. The transmission code may correspond to the "put" instruction shown in trace 1 of first stage 70a of FIG. 7, for example. Furthermore, all live set data for off-trace codes may also be sent.

Finally with reference to FIG. 8, the trace-specific live set transmission may be set up for the downstream stage (block 160). Although different manners of performing this set up are possible, shown in FIG. 10 is a flow diagram of one method of setting up the downstream stage.

Figure 10:
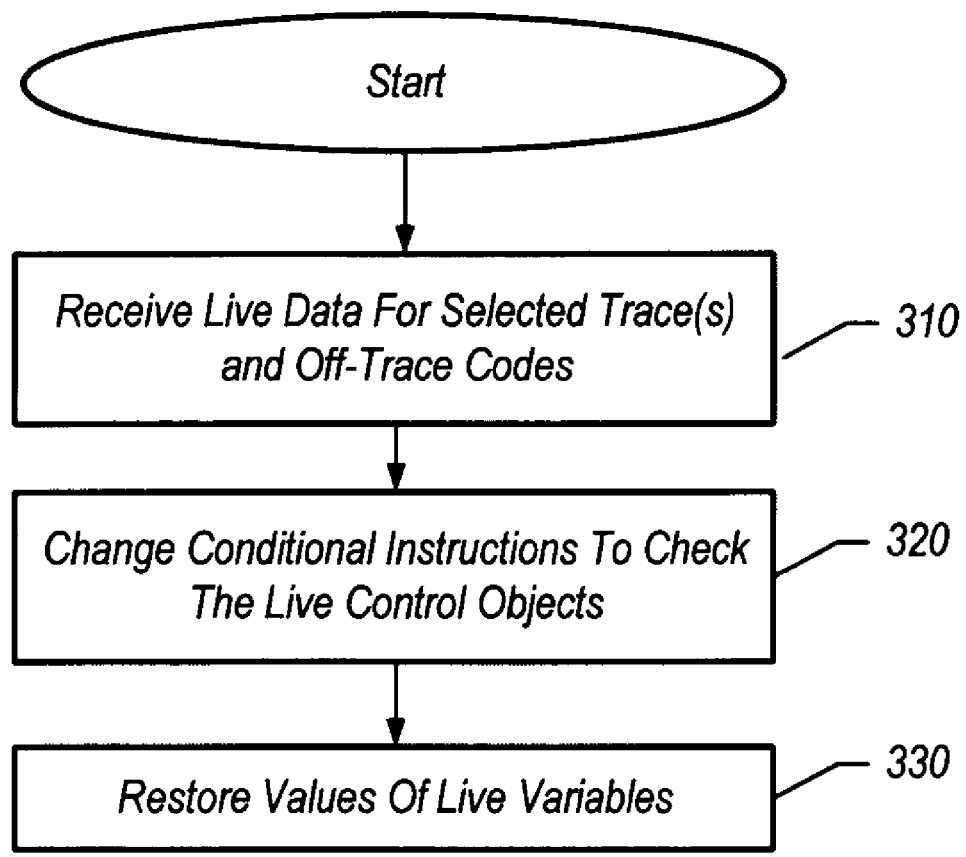
FIG. 10 is a flow diagram of a method of setting up a downstream stage in accordance with one embodiment of the present invention.

As shown in FIG. 10, method 300 may be used to set up the downstream stage similarly to setting up the upstream stage. That is, at the beginning of the downstream stage, the live data may be received for each trace if its check is true, and the whole live set is received for the off-trace codes (block 310). For example, the same instruction [1] used to set up the upstream stage for transmission of trace-specific live set information may be implemented in the downstream stage for receiving the trace-specific live set information. Thus in various embodiments, the "if (trace 1 is taken)" instruction shown in the first block of second stage 70b of FIG. 7 may correspond to the same conditional code of instruction [1]. Next, conditional instructions in the upstream stage may be changed to check the value of the associated control objects (if they are alive) (block 320). In addition, the values of the live variables may be restored in the counterpart of their definition points in the downstream stage (block 330).

Figure 11:
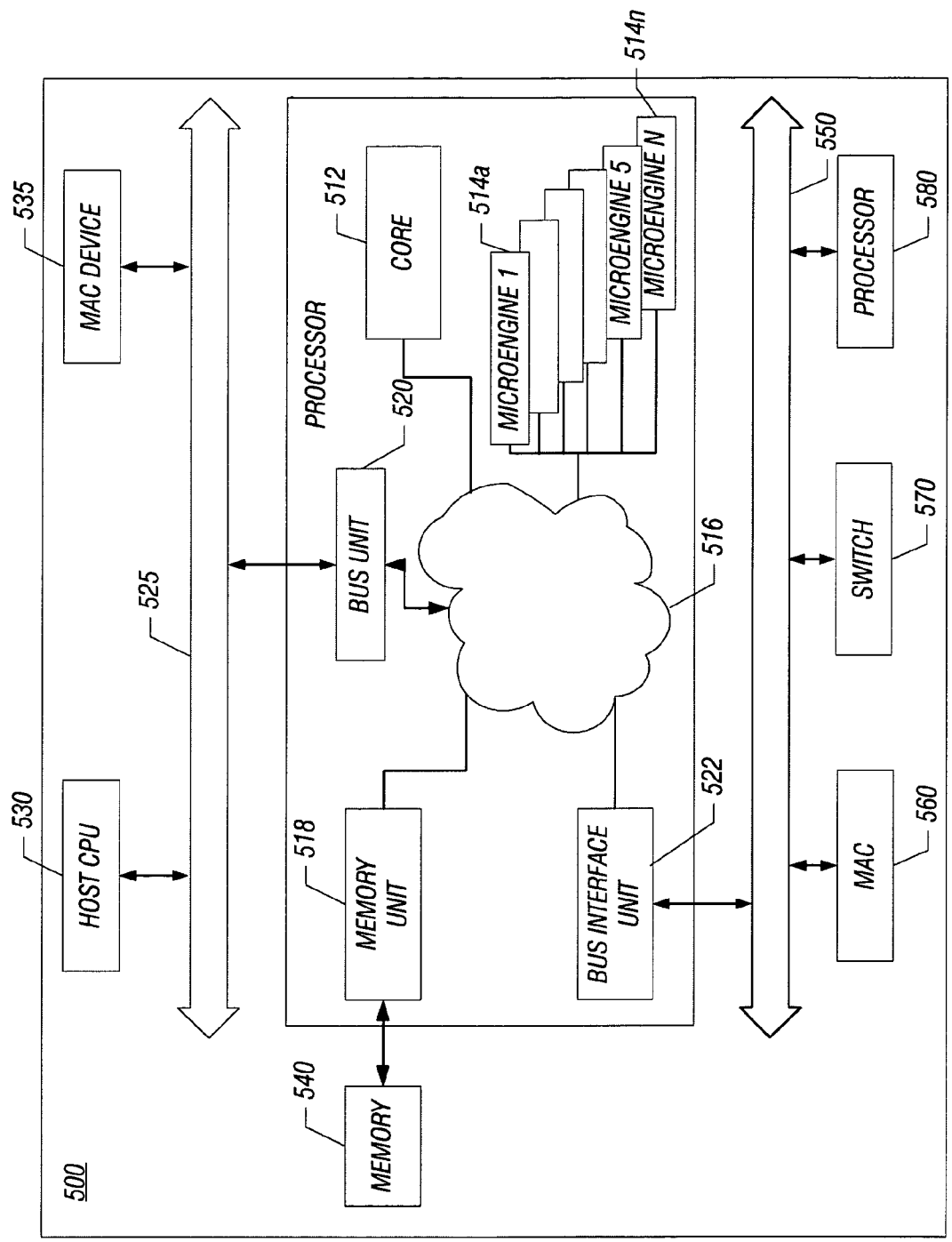
FIG. 11 is block diagram of a system in accordance with one embodiment of the present invention.

Referring now to FIG. 11, shown is block diagram of a system in accordance with one embodiment of the present invention. As shown in FIG. 11, system 500 may be a network system such as a server, router or other switching device. As shown in FIG. 5, system 500 may include a processor 510, which may be, for example, a network processor. Network processor 510 may include a processor core 512 to control operation of the processor. In some embodiments, core 512 may be a reduced instruction set computing (RISC) processor. Furthermore, a plurality of microengines 514a-514n (generically microengines 514) are present. Microengines 514 may be used to perform highly parallelized applications. For example, a transformed program may be executed by at least two of the microengines such that a first microengine executes a first pipeline stage (i.e., an upstream stage) and a second microengine executes a second pipeline stage (i.e., a downstream stage).

As further shown in FIG. 11, an internal bus structure 516 may couple various components within processor 510. Processor 510 may further include a bus unit 520 for connection to a first bus 525 which may be, for example, a Peripheral Component Interconnect (PCI) bus in accordance with the PCI Local Bus Specification, Rev. 2.1, dated June 1995. Furthermore, processor 510 may include a bus interface unit 522 for connection to a second bus 550, which may be a high-speed data transfer bus. Finally, processor 510 may further include a memory unit 518 to provide an interface to a memory 540, which in one embodiment may be a dynamic random access memory (DRAM), although the scope of the present invention is not so limited.

Still referring to FIG. 11, first bus 525 may be coupled to a host processor 530 (which may be a central processing unit or other system processor). In some embodiments, host processor 530 may execute a compiler, such as may be stored in memory 540 to perform embodiments of the present invention. Furthermore, a media access controller (MAC) 535 may also be coupled to first bus 525. Of course in many embodiments additional components may be coupled to first bus 525. Still referring to FIG. 11, a plurality of components may also be coupled to second bus 550. In the embodiment shown in FIG. 11, these components may include a MAC 560, an asynchronous transfer mode (ATM) switch 570, and another processor 580, which may be another network processor configured similarly to processor 510. While shown with this particular implementation in the embodiment of FIG. 11, it is to be understood that the scope of the present invention is not so limited and embodiments of the present invention may be used with many different types of systems including various processor architectures.

Thus, in various embodiments, only trace-specific live set data is transmitted, which minimizes the live set transmission for the selected traces. In such manner, only a subset of the live set needed for the specific trace is transmitted, in addition to an aggregated live set transmission for off-trace codes.

Various embodiments may be implemented within a compiler, such as C compiler. By performing trace-specific live set transmission, the performance of pipelined and multi-threaded applications such as network applications may be greatly improved, as the transmission of the live set between pipeline stages can be significantly reduced for the selected traces with similar reductions on synchronizations between threads. Of course, embodiments may applicable to tools that perform other program partitioning.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   partitioning a program segment into a plurality of stages including at least a first stage and a second stage, each of the first and second stages to be performed on a different processor;
   determining a live set including at least one variable and control flow information alive at a boundary between the first stage and the second stage, the control flow information corresponding to at least one control object assigned to a control value in the first stage;
   receiving trace selection information to identify a trace in the first stage for analysis;
   analyzing the trace to determine a trace-specific portion of the live set to transmit from the first stage to the second stage, the trace-specific portion of the live set comprising at least one trace-specific variable and control flow information from the live set, the analyzing including determining the at least one trace-specific variable by determining if a definition point for the at least one trace-specific variable in the first stage is present in the trace and the at least one trace-specific variable reaches a use point in the second stage that is not control dependent on a conditional instruction in the first stage, the analyzing further including determining the at least one trace-specific control flow information by determining if the corresponding control object is present in the trace;
   inserting first code in the first stage to determine if the trace is taken; and
   inserting second code in the first stage to transmit the trace-specific portion of the live set if the trace is taken; and
   controlling the first stage to transmit the trace-specific portion of the live set to the second stage via a communication channel coupled between the first and second stages using the second code and not to transmit a trace-specific portion of the live set for an alternative trace in the first stage when the alternative trace is not taken as determined by the first code.

2. The method of claim 1, wherein the trace-specific portion comprises a minimum data block for the trace.

3. The method of claim 1, wherein determining the live set comprises profiling a program including the program segment.

4. The method of claim 1, wherein determining the trace-specific portion comprises determining if a conditional instruction associated with the control object corresponding to the control flow information is present in the trace.

5. The method of claim 1, wherein determining the live set of control flow information comprises building a control dependence graph.

6. A method comprising:
   partitioning a program unit into at least an upstream stage and a downstream stage, the upstream stage and the downstream stage each to be performed on a different processor;
   receiving trace selection information to identify a trace in the upstream stage for analysis;
   analyzing the trace to determine trace-specific minimum data to transmit from the upstream stage to the downstream stage, the trace-specific minimum data including at least one variable and control flow information alive at a boundary between the upstream stage and the downstream stage, the control flow information corresponding to at least one control object assigned to a control value in the trace, the analyzing including determining the at least one variable from a set of variables alive at the boundary by determining if a definition point for the at least one variable in the upstream stage is present in the trace and the at least one variable reaches a use point in the downstream stage that is not control dependent on a conditional instruction in the upstream stage;
   inserting first code in the upstream stage to transmit the trace-specific minimum data if the trace is taken; and
   inserting second code in the upstream stage to determine if the trace is taken.

7. The method of claim 6, further comprising profiling the program unit to identify the trace for analysis.

8. The method of claim 6, wherein the program unit comprises a multi-threaded application, and wherein the upstream stage comprises a first multi-threaded stage and the downstream stage comprises a second multi-threaded stage.

9. A system comprising:
   a first processor unit to execute an upstream stage of a pipelined program; and
   a second processor unit to execute a downstream stage of the pipelined program, the second processor unit coupled to the first processor unit via a transmission channel;
   an analyzer unit to receive trace selection information to identify a first trace in the upstream stage for analysis, the analyzer unit further to determine a first trace-specific live set of the first trace to transmit from the upstream stage to the downstream stage, the first trace-specific live set including at least one variable and control flow information alive at a boundary between the upstream stage and the downstream stage, the control flow information corresponding to at least one control object assigned to a control value in the first trace, the analyzer unit further to determine the at least one variable from a set of variables alive at the boundary by determining if a definition point for the at least one variable in the upstream stage is present in the first trace and the at least one variable reaches a use point in the downstream stage that is not control dependent on a conditional instruction in the upstream stage;
   an instrumentation unit to insert first code in the upstream stage to determine if the first trace is taken and insert second code in the upstream stage to transmit the first trace-specific live set if the first trace is taken;
   wherein the first processor unit is to transmit the first trace-specific live set to the second processor unit when the first trace of the upstream stage is taken by the execution of the second code, and not transmit a second trace-specific live set of a second trace of the upstream stage when the second trace of the upstream stage is not taken as determined by the first code.

10. The system of claim 9, wherein the first processor unit comprises a first engine of a network processor and the second processor unit comprises a second engine of the network processor.

11. The system of claim 10, further comprising a system processor coupled to the network processor, the system processor to execute one or more routines to optimize the pipelined program for the network processor.

12. The system of claim 11, wherein the system processor is to transform a network application into the upstream stage and the downstream stage.

13. The system of claim 11, wherein the first code corresponds to a section of the pipelined program at which a synchronization between multiple threads of the pipelined program is to occur.

* * * * *